United States Patent [19]

MacKnight et al.

[11] 4,342,116
[45] Jul. 27, 1982

[54] DRY EXCITED SINGLET DELTA OXYGEN GENERATOR

[75] Inventors: Allen K. MacKnight, Rolling Hills Estates; A. Colin Stancliffe, Palos Verdes Estates, both of Calif.

[73] Assignee: The Garrett Corporation, Los Angeles, Calif.

[21] Appl. No.: 129,544

[22] Filed: Mar. 11, 1980

[51] Int. Cl.³ .......................... C01B 13/00; H01S 3/00
[52] U.S. Cl. ..................................... 372/89; 422/120; 423/579
[58] Field of Search .................... 423/579; 422/120; 331/94.5 G; 372/89

[56] References Cited

U.S. PATENT DOCUMENTS

| | | | |
|---|---|---|---|
| 3,980,762 | 9/1976 | Shiblom et al. | 423/579 |
| 4,030,890 | 6/1977 | Diggs | 423/579 |
| 4,071,608 | 1/1978 | Diggs | 423/579 |
| 4,102,950 | 7/1978 | Pilipovich et al. | 423/579 |
| 4,246,252 | 1/1981 | McDermott et al. | 423/579 |
| 4,267,526 | 5/1981 | McDermott et al. | 331/94.5 G |

OTHER PUBLICATIONS

Kearns, "Chemical Reviews", 1971, vol. 71, No. 4, pp. 395–411.
Foote et al., "Journal of American Chemical Society", 90, 1968, pp. 975–981.
Balny et al., "Methode De Production D'Oxygene Singulet Pur ($^1\Delta gO_2$)", 1970.
MacKnight et al., "Chemical Production of Singlet Oxygen", AFWL-TR-74-344.
Held et al., "Mechanisms of Chlorine Oxidation of Hydrogen Peroxide", Journal of the American Chemical Society, 100, 5732 (1978).
McDermott et al., "An Electronic Transition Chemical Laser", Appl. Phys. Lett. 32 (8), Apr. 15, 1978.
Bernard et al., "Efficient Operation of a 100-W Transverse-Flow Oxygen-Iodine Chemical Laser", Appl. Phys. Lett. 34 (1), Jan. 1, 1979, pp. 40, 41.

Primary Examiner—O. R. Vertiz
Assistant Examiner—Wayne A. Langel
Attorney, Agent, or Firm—Joel D. Talcott; James W. McFarland; Albert J. Miller

[57] ABSTRACT

An improved method and apparatus for producing dry excited singlet delta oxygen for use in iodine lasers.

12 Claims, 1 Drawing Figure

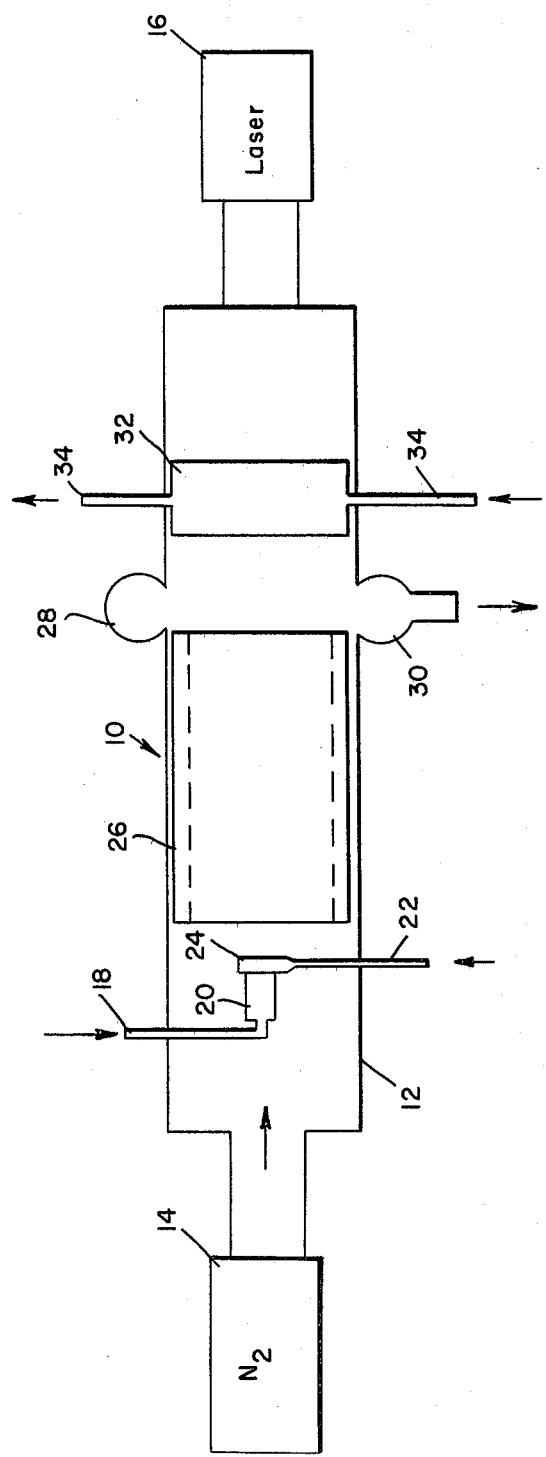

DRY EXCITED SINGLET DELTA OXYGEN GENERATOR

The Government has rights in this invention pursuant to Contract No. F29601-79-C-0033 awarded by the Department of the Air Force.

This invention relates to lasers and, more particularly, to an improved apparatus for generating dry excited singlet delta oxygen used in the operation of iodine lasers. There has recently been emerging an increased interest in continuous wave (CW) iodine chemical lasers. The wave length of the laser transition (1315.2 nanometers) lies in a region of favorable atmospheric transmission. Further, the energy source for the laser, being completely chemical, requires no significant external sources of power. Since the energy transfer rate dominates all quenching rates in the system (including the reverse pumping reaction), gas phase mixing problems are minimized; and the conditions essential for operation at greater than 100 torr pressure exist. Finally, this laser represents the first of a class of chemically pumped electronic transition lasers, any of which could be of great interest for future development.

These chemically pumped iodine lasers utilize singlet delta oxygen which has been produced heretofore by a hetrogenous gas/liquid phase reaction which produces molecular oxygen in the singlet delta state. This species acts as an energy transfer agent to pump the $^2P_{\frac{1}{2}}$-$^2P_{3/2}$ spin orbit transition of atomic iodine. The singlet delta oxygen generator provides the major portion of the mass flow of the chemical laser. Thus, an efficient, high yield generator is essential for the effective operation of such a laser at high output powers. The chemical reaction commonly used in the prior art to produce singlet delta oxygen is a hypochlorite $H_2O_2$ reaction. The overall stoichoimetry of the reaction is given by

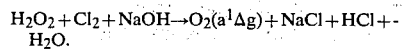

$$H_2O_2 + Cl_2 + NaOH \rightarrow O_2(a^1\Delta g) + NaCl + HCl + H_2O.$$

The reaction is produced by bubbling chlorine gas through a hydrogen peroxide-sodium hydroxide mixture. Unfortunately, because of the large quantities of foam which develop during the course of this reaction there is a substantial limitation upon the flow rate of chlorine and, accordingly, upon the rate of singlet delta oxygen produced.

In accordance with this invention, a novel apparatus and method for producing dry excited singlet delta oxygen are provided. Nitrogen is utilized as a carrier gas to allow high total pressure operation of the device. A mixture of hydrogen peroxide and potassium hydroxide (or other hydroxides such as sodium hydroxide, cesium hydroxide, or calcium hydroxide) is sprayed under pressure against a jet of gaseous chlorine to produce a fine spray of liquid droplets surrounded by chlorine gas. By the above described reaction, a mixture of singlet delta excited oxygen and salt water ($H_2O$ and KCl) is produced in nitrogen gas along with traces of initial and intermediate reactants.

The mixture is carried to the inlet of a rotating or static centrifugal separator wherein the water droplets are removed from the gaseous stream. The nitrogen and excited oxygen then flow to the inlet of a freezing section to remove any remaining water vapor. The resultant product is a gas comprising as its principal constituents, singlet delta oxygen and the carrier gas nitrogen. This may then be transferred for reaction in the iodine laser without interference from the nitrogen gas which is inert.

The advantages of the singlet delta oxygen generator of this invention will be more readily apparent when the following specification is read in conjunction with the appended drawing which is a generally schematic view of a singlet delta oxygen generator in accordance with this invention.

Referring now to the drawing, a singlet delta oxygen generator 10 is contained in a suitable housing 12 which may be a conduit connecting a source of nitrogen gas 14 and an iodine laser 16. Of course, it will be readily understood that the oxygen generator 10 may be utilized in any circumstances where a source of singlet delta oxygen is required. The flow of nitrogen from the source 14 is maintained at a pressure of up to one atmosphere throughout the process of oxygen generation.

A mixture of hydrogen peroxide and potassium hydroxide in liquid form is sent through a conduit 18 to a nozzle 20 for injection into the flow of nitrogen gas in the generator 10. In the preferred embodiment, the liquid contains, on a molar basis, about 9.33 percent hydrogen peroxide and 18.67 percent potassium hydroxide and 72 percent water. However, other hydroxides, such as sodium hydroxide, cesium hydroxide, calcium hydroxide and others may be used as alternatives to potassium hydroxide where desirable.

Chlorine gas is fed through a conduit 22 into a jet 24 interposed directly ahead of nozzle 20 such that the mixture of hydrogen peroxide and potassium hydroxide is sprayed under pressure against the gaseous chlorine flow to produce a fine spray of liquid droplets surrounded by chlorine gas. The liquid mixture and chlorine react by the reaction:

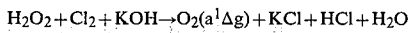

$$H_2O_2 + Cl_2 + KOH \rightarrow O_2(a^1\Delta g) + KCl + HCl + H_2O$$

to produce a mixture of singlet delta excited oxygen and salt water ($H_2O$ + KCl) in the nitrogen gas. In addition, traces of the initial reaction as well as intermediate reactants of the chemical reactants will be found in the nitrogen gas stream. Unlike previous systems wherein chlorine was bubbled through vats of the liquid mixture, no foam develops in the generator 10. Thus, the consumption rate of chemicals is limited only by the physical configuration of the generator 10.

The wet mixture is then carried by the flow of nitrogen gas to the inlet of a rotating centrifugal separator 26. In the separator, the water droplets are forced to the outer diameter of the rotating drum forming the principal component of the separator. The droplets coalesce to form a rotating film of liquid which flows along the surface of the drum, driven by the gas flow, until it is driven radially into a toroidal collector 28 from which the fluid is directed through a tube 30 for disposal.

The nitrogen and excited oxygen flow along the separator to the inlet of a freezing section 32 which is preferably one pass of a heat exchanger, the other pass of which is connected to a source of liquid nitrogen through a conduit 34. In the freezing section, substantially all of the water vapor remaining in the flowing gas is removed.

At the outlet of the freezing section 32, a mixture of gases exists consisting of up to 50 torr of total oxygen (having more than 50 percent singlet delta oxygen), less than 20 torr of initial and intermediate reactants, less than 1 torr of water and the balance of nitrogen.

In this manner, a generator is provided which can produce singlet delta oxygen in any suitable quantities required without the problems encountered in the prior art chlorine bubbling type systems. It should be noted that the production of liquid droplets in fine spray may be accomplished in a variety of ways, for example, by use of commercial blend fuel injectors commonly used in gas turbine combustion chambers or by fuel injectors commonly used in oil furnaces.

While the Applicant has endeavored to set forth the preferred embodiment of practicing the invention, the scope of the invention should not be limited by the specification but only by the scope of the following claims.

We claim:

1. A method of producing coherent energy, said method comprising the steps of:
   providing a flow of inert gas;
   injecting a liquid mixture of hydrogen peroxide and potassium hydroxide into the flow of said inert gas;
   interposing a flow of chlorine gas in the path of the liquid flow such that the chlorine, hydrogen peroxide and potassium hydroxide react to produce excited oxygen; and
   combining the excited oxygen with atomic iodine such that the oxygen acts as an energy transfer agent to pump the $^2P_{\frac{1}{2}} \, ^2P_{3/2}$ spin orbit transition of said atomic iodine.

2. The method of claim 1 wherein said chlorine, hydrogen peroxide and potassium hydroxide combine by the reaction:

$$H_2O_2 + Cl_2 + KOH \rightarrow O_2(a^1\Delta g) + KCl + HCl + H_2O.$$

3. The method of claim 1 or 2 wherein liquid is produced by said reaction and including the additional step of:
   separating said liquid from said excited oxygen.

4. The method of claim 3 wherein said step of separating said liquid comprises:
   passing the products of said reaction into a centrifugal separator; and
   diverting said liquid from the flow of gas.

5. The method of claim 4 wherein separating said liquid comprises the additional step of introducing said gas into freezer means for precipitating additional liquid therefrom.

6. A method of generating excited oxygen, said method comprising:
   providing a flow of inert gas;
   injecting a liquid mixture of hydrogen peroxide and potassium hydroxide into the flow of said inert gas, and
   interposing a flow of chlorine gas in the path of the liquid flow such that the chlorine, hydrogen peroxide and potassium hydroxide reacts to produce excited oxygen.

7. The method of claim 6 wherein said chlorine, hydrogen peroxide and potassium hydroxide combine by the reaction:

$$H_2O_2 + Cl_2 + KOH \rightarrow O_2(a^1\Delta g) + KCl + HCl + H_2O.$$

8. The method of claim 6 or 7 wherein liquid is produced by said reaction and including the additional step of:
   separating said liquid from said excited oxygen.

9. The method of claim 8 wherein said step of separating said liquid comprises:
   passing the products of said reaction into a centrifugal separator; and
   diverting said liquid from the flow of gas.

10. The method of claim 9 wherein separating said liquid comprises the additional step of introducing said gas into freezer means for precipitating additional liquid therefrom.

11. A method of generating excited oxygen, comprising the steps of:
    producing a jet of chlorine gas; and
    spraying a liquid mixture of hydrogen peroxide and potassium hydroxide against the jet of chlorine gas to produce a spray of liquid droplets substantially surrounded by the chlorine gas, such that the chlorine, hydrogen peroxide and potassium hydroxide react to produce excited oxygen.

12. A method of generating excited oxygen, comprising the steps of:
    providing a flow of inert gas carrier;
    injecting a jet of chlorine gas into the flow of inert gas; and
    spraying a pressurized liquid mixture of hydrogen peroxide and potassium hydroxide against the jet of chlorine gas to produce a spray of liquid droplets in the chlorine gas such that the chlorine, hydrogen peroxide and potassium hydroxide react to produce excited oxygen transported by said gas carrier substantially without foaming.

* * * * *